United States Patent
Sankaranarayanan et al.

(10) Patent No.: US 12,032,470 B2
(45) Date of Patent: Jul. 9, 2024

(54) DYNAMIC CLOUD BASED ALERT AND THRESHOLD GENERATION

(71) Applicant: Oracle International Corporation, Redwood Shores, CA (US)

(72) Inventors: Hari Bhaskar Sankaranarayanan, Bangalore (IN); Dwijen Bhattacharjee, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 17/528,692

(22) Filed: Nov. 17, 2021

(65) Prior Publication Data

US 2023/0153223 A1    May 18, 2023

(51) Int. Cl.
| | |
|---|---|
| G06F 11/00 | (2006.01) |
| G06F 11/07 | (2006.01) |
| G06F 11/34 | (2006.01) |
| G06F 18/214 | (2023.01) |
| G06N 3/04 | (2023.01) |

(52) U.S. Cl.
CPC ...... *G06F 11/3457* (2013.01); *G06F 11/0709* (2013.01); *G06F 11/0769* (2013.01); *G06F 18/214* (2023.01); *G06N 3/04* (2013.01)

(58) Field of Classification Search
CPC ............ G06F 11/3457; G06F 11/0709; G06F 11/0769; G06F 11/0712; G06F 11/301; G06F 11/3409; G06F 11/0793
See application file for complete search history.

(56) References Cited

U.S. PATENT DOCUMENTS

| | | |
|---|---|---|
| 10,063,654 B2 | 8/2018 | Kirti et al. |
| 11,507,447 B1 * | 11/2022 | Ezrielev .............. G06F 11/3457 |

(Continued)

FOREIGN PATENT DOCUMENTS

CN        113822412 A  * 12/2021

OTHER PUBLICATIONS

SolarWinds, Configure a DPA Resources alert, Jun. 16, 2021, https://web.archive.org/web/20210616201236/https://documentation.solarwinds.com/en/success_center/dpa/content/dpa-create-resources-alert.htm, 3 pages (Year: 2021).*

(Continued)

*Primary Examiner* — Katherine Lin
(74) *Attorney, Agent, or Firm* — Potomac Law Group, PLLC

(57) ABSTRACT

Embodiments monitor for faults in a cloud based network for a plurality of features comprising an application and dependent features. Embodiments generate a graphical representation of the plurality of features comprising a plurality of nodes and corresponding relationships between the nodes, each node corresponding to one of the plurality of features. Embodiments monitor for events for the plurality of features, the events corresponding to one or more of the nodes, to generate monitored events. Embodiments populate a graph database with the monitored events and classify each of the nodes with a trained graph neural network ("GNN"), the classification comprising a prediction of a failure of at least one node. Based on the classifying, for a failure node corresponding to the prediction, embodiments generate a new alert for the failure node or revise a threshold for an existing alert for the failure node.

20 Claims, 13 Drawing Sheets

(56) References Cited

U.S. PATENT DOCUMENTS

2019/0068627 A1 2/2019 Thampy
2021/0049441 A1* 2/2021 Bronstein ............ G06N 3/045

OTHER PUBLICATIONS

Kung-Hsiang, "A Gentle Introduction to Graph Neural Networks (Basic, DeepWalk, and GraphSage)," Towards Data Science, 2019, 10 pages, retrieved from: https://towardsdatascience.com/a-gentle-introduction-to-graph-neural-network-basics-deepwalk-and-graphsage-db5d540d50b3.

* cited by examiner

DYNAMIC CLOUD BASED ALERT AND THRESHOLD GENERATION

FIELD

One embodiment is directed generally to a computer network system, and in particular to a cloud based computer network system.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

The reliance of organizations on computing environments has led to widespread adoption of applications for operations such as collaboration, sales and customer services, infrastructures, and so on. Applications provided through a cloud environment may enable organizations to rollout services faster and without much upfront investment on data center, hardware, software, and deployment projects. The accessibility of applications can increase employee productivity due to the availability of cloud enabled services from many locations, such as at work, at home, at a hotel, and other locations. However, managing such complex networks for failures and potential failures remains a challenge.

SUMMARY

Embodiments monitor for faults in a cloud based network for a plurality of features comprising an application and dependent features. Embodiments generate a graphical representation of the plurality of features comprising a plurality of nodes and corresponding relationships between the nodes, each node corresponding to one of the plurality of features. Embodiments monitor for events for the plurality of features, the events corresponding to one or more of the nodes, to generate monitored events. Embodiments populate a graph database with the monitored events and classify each of the nodes with a trained graph neural network ("GNN"), the classification comprising a prediction of a failure of at least one node. Based on the classifying, for a failure node corresponding to the prediction, embodiments generate a new alert for the failure node or revise a threshold for an existing alert for the failure node.

Figure 1:
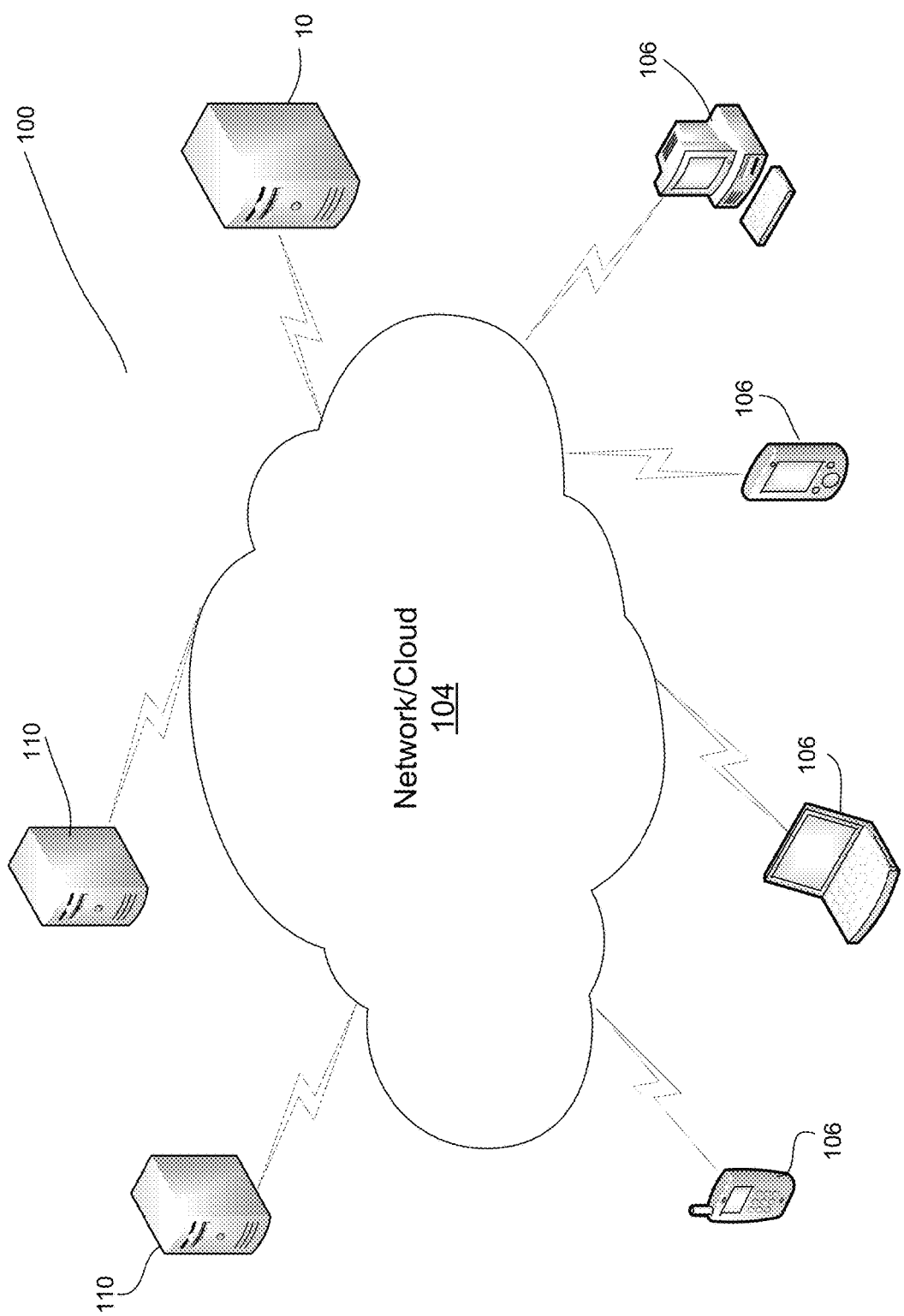
FIG. 1 illustrates an example of a system that includes a dynamic alert and threshold generation system in accordance to embodiments.

Further embodiments, details, advantages, and modifications will become apparent from the following detailed description of the embodiments, which is to be taken in conjunction with the accompanying drawings.

DETAILED DESCRIPTION

One embodiment is a dynamic alert and threshold generation system for a cloud provider. Embodiments generate alerts and/or revises alert thresholds dynamically based on causation mining using a graph neural network ("GNN") that assist in predicting failures in the cloud network.

Cloud service providers can provide various services to customers of the cloud services providers. Customers can be individual users and/or organizations, where an organization can include multiple users. An organization is an entity that brings people and resources together to serve a common purpose or purposes, within which user accounts are under common administration. Examples of organizations include companies, universities, utilities, and governmental entities, among others. Users are digital entities associated with a user identifier, such as a user name, and associated with one or more user accounts. Users of an organization, for example, can be associated with at least one user account that is maintained by the organization. Activities of a user may be driven by one person (e.g., a human being), multiple people, and/or software programs. Users and organizations can subscribe to the services of a cloud services provider by registering with the service provider. In most cases, the cloud services provider provides the users and organizations with an account within the systems of the services provider. Subscribers of a cloud service provider are also referred to herein as tenants.

The services provided by a cloud services provider, which can include network infrastructure, development and/or hosting platforms, and/or software, are hosted by the cloud services provider. Hosting the services means that the services run on and/or are maintained by computing systems under the control of the cloud services provider. The cloud services providers provide services to subscribers over a network, such as the Internet, and the subscribers use the services using computing systems under the control of each individual subscriber.

Within the cloud services ecosystem, a dynamic alert and threshold generation system in accordance with embodiments of the invention can assist the cloud provider in predicting failures within the cloud system.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates an example of a system 100 that includes a dynamic alert and threshold generation system 10 in accordance to embodiments. Dynamic alert and threshold generation system 10 may be implemented within a computing environment that includes a communication network/ cloud 104. Network 104 may be a private network that can communicate with a public network (e.g., the Internet) to access services 110 provided by a cloud services provider. Examples of communication networks include a mobile network, a wireless network, a cellular network, a local area network ("LAN"), a wide area network ("WAN"), other wireless communication networks, or combinations of these and other networks. Dynamic alert and threshold generation system 10 may be administered by a service provider, such as via the Oracle Cloud Infrastructure ("OCI") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of dynamic alert and threshold generation system 10 of dynamically generating alerts and revising alert thresholds for system 100. As disclosed herein, a "client" (also disclosed as a "client system" or a "client device") may be a device or an application executing on a device. System 100 includes a number of different types of client devices 106 that each is able to communicate with network 104.

Figure 2:
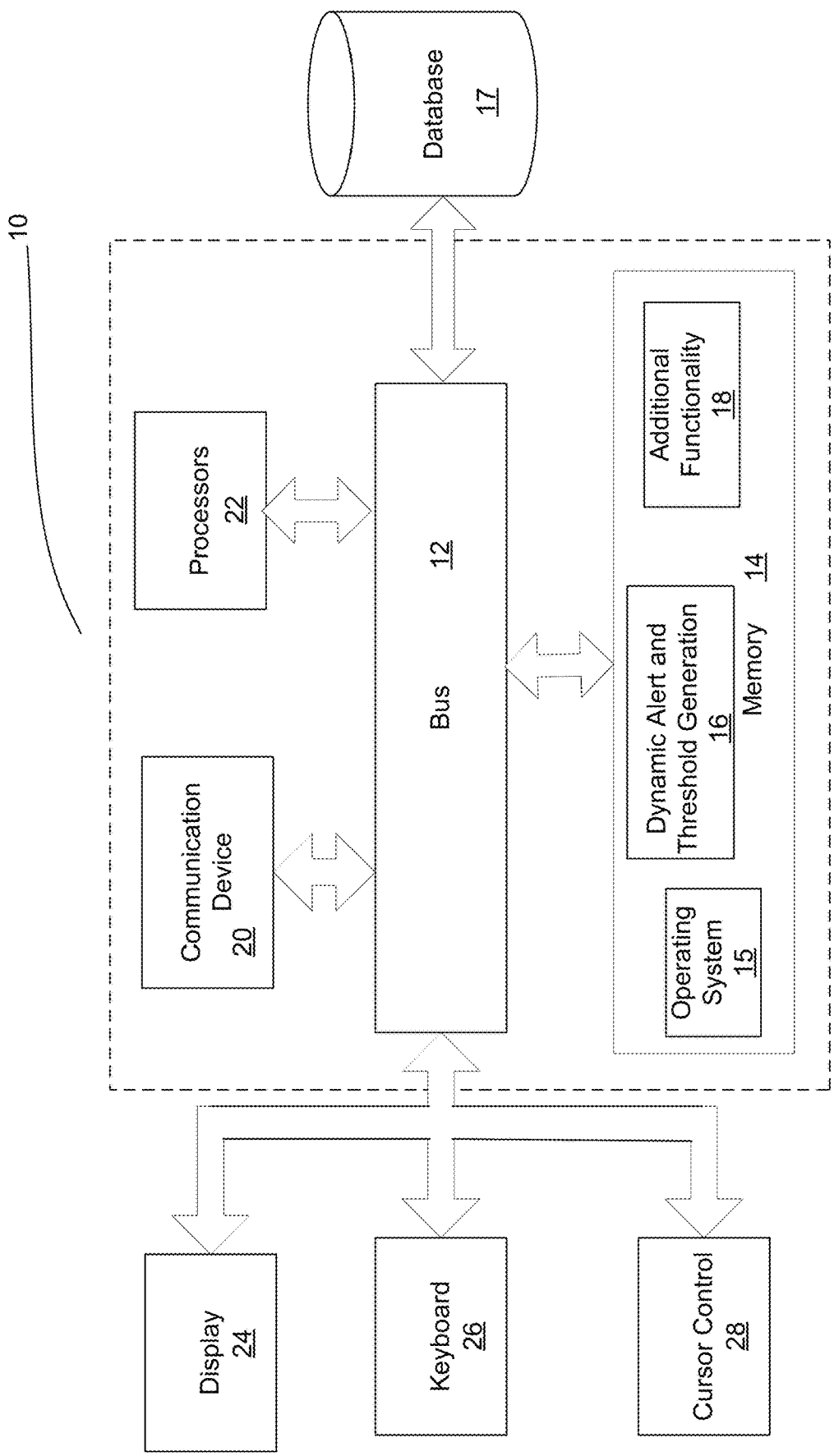
FIG. 2 is a block diagram of the dynamic alert and threshold generation system of FIG. 1 in the form of a computer server/system in accordance with an embodiment of the present invention.

FIG. 2 is a block diagram of dynamic alert and threshold generation system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic alert and threshold generation module 16 that uses causation mining with a GNN to dynamically generate alerts and revise alert thresholds for cloud 104, and all other functionality disclosed herein. System 10 can be part of a larger system. Therefore, system 10 can include one or more additional functional modules 18 to include the additional functionality, such as any other functionality provided by the Oracle Cloud Infrastructure ("OC I") from Oracle Corp. A file storage device or database 17 is coupled to bus 12 to provide centralized storage for modules 16 and 18, including data regarding existing alerts and alert criteria. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

Referring again to FIG. 1, predicting failures within a cloud infrastructure such as system 100 is a technically difficult problem. It is nearly impossible to predict the outcomes of a simple security patch at a database level that can cause havoc at an application level. While there are known solutions to perform impact assessment of other areas of the cloud in response to a failure of an initial area, generating alerts in response to failures typically incorporates a surprise element as it is hard to estimate the impact areas due to the nature of software applications that run on the infrastructure. The knowledge domain for a cloud based system is vast, and involves constant learning that is mostly reactive. The causation of failures can be represented as a graphical pattern of events which may be complex and difficult to understand. Known techniques using Bayesian networks based on a probability graphs model may help in deciphering failures, but predicting failures continues to remain a complex problem to understand and solve.

Depending upon the context in known solutions, some alerts are also configured on top of the monitoring metrics. These alerts, in general, have a predefined static threshold criterion and when the system breaches the threshold it generates an alert to notify an administrator. However, a static criteria may not be effective in many situations. If the system is complex and big enough so as not to be easily comprehended by a human, then a lot of high impact situations are not covered in the alerting criteria. Further, if the dynamics of the system changes rapidly, the criteria for the alert also needs to dynamically adapt. For example, most fraud detection alerts for banking systems were impacted during the covid pandemic when customers increased online shopping as a significant change of their online behavior. Similarly, applying a security patch at a database level can impact many applications that depend on the database. These situations are generally difficult to monitor and generate appropriate alerts in large systems with many dependencies. Specifically, a static "if this then that" rule does not work effectively for large complex systems. Instead, large systems need to be mined constantly to find the relations and impacted areas, business context etc. and depending upon these inputs the alert criteria may need to revised, and in the absence of alert, a new alert may need to be added.

In contrast to known alerting systems, embodiments generate alerts dynamically based on causation mining performed using GNN. The generation of alerts and thresholds may vary based on the node classification algorithm. The node classification is done based on the nature of a component change (e.g., a security certificate change causing outages), business impact and associated constraints (e.g., memory limitations) which are mined from the causation analysis. If the classified node is identified and predicted to generate a fault event, then new alerts are generated for them. If the alerts are already in place, the threshold values are modified accordingly. The threshold limit defines the acceptable fault level, and it may vary across classified nodes.

Known causation mining methods are highly reactive and not proactive. Causation requires the history of what happened and then analyzing why it occurred by connecting the events by a graph. In contrast, embodiments are directed to a proactive solution that generates new alerts or revises existing alerts and is truly dynamic in nature based on the GNN node classification algorithm. The node classification algorithm predicts the impact using impact scores based on various usage areas derived from past events and generates the newer thresholds. For example, alerts for a software patch change will vary significantly over the horizon of time and based on the graph-based learning algorithm. The novel learning process in accordance to embodiments defines new alerts and modifies thresholds for existing alerts to prevent overall faults. As a result, embodiments reduce the faults to a minimal level based on the combination of continuous causation mining and graph-based learning techniques.

Figure 3:
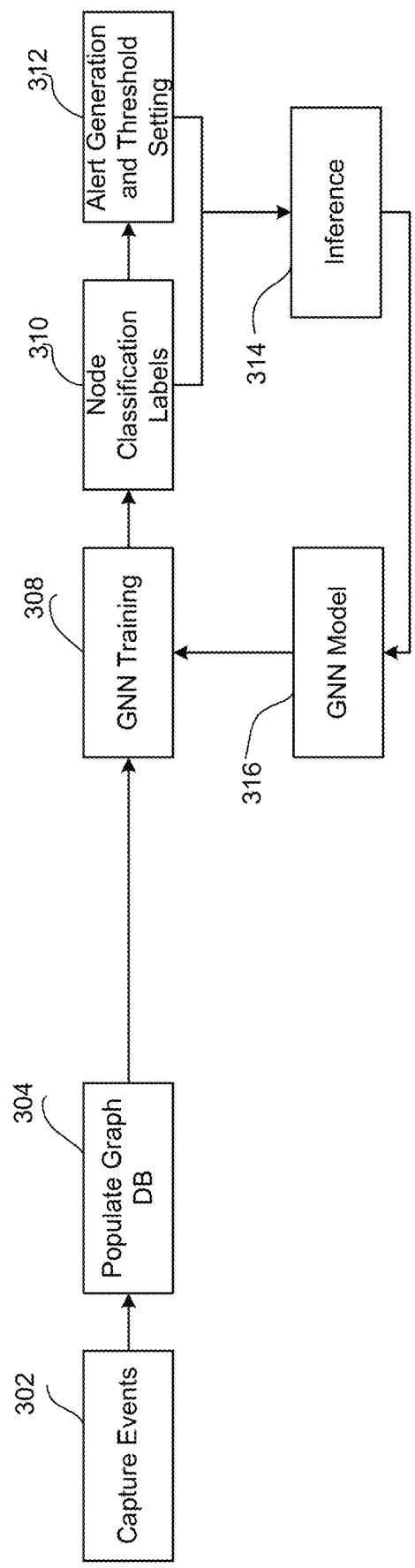
FIG. 3 is a flow diagram of the functionality of the dynamic alert and threshold generation system of FIG. 1 for using causation mining with a graph neural network to dynamically generate alerts and revise alert thresholds in accordance with one embodiment.

FIG. 3 is a flow diagram of the functionality of dynamic alert and threshold generation system 10 of FIG. 1 for using causation mining with GNN to dynamically generate alerts and revise alert thresholds in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Data Preprocessing and Transformation

At 302, events for one or more applications on network/cloud 104 are monitored. Examples of an application to be monitored include compute instances such as virtual machines, bare metal, databases, application containers, web services which are deployed as Application Programming Interface ("API") end points, etc. Embodiments can work on a per application basis, or monitor multiple applications at once. The applications can be used by a single tenant, or by multiple tenants. The application generates information about its current condition using various means. The application generates logs which are ingested in a logging system, generates monitoring metrics which are ingested in a monitoring system, and generates telemetry data, system event data, etc., which are ingested in various systems. The telemetry data is used to gather data on the use and performance of applications and application components, such as how often certain features are used, measurements of start-up times and processing times, hardware, application crashes, and general usage statistics and/or user behavior. In some cases, very detailed data is reported, such as individual window metrics, counts of used features, and individual function timings.

The monitoring performed at 302 can be done by a separate monitoring system. The monitored application constantly publishes monitoring metrics that the monitoring system constantly monitors. For example, the monitoring system may be implemented by a "Prometheus" based system which collects data from different systems and stores them in a monitoring database. Prometheus collects and stores its metrics as time series data, i.e. metrics information is stored with the timestamp at which it was recorded, alongside optional key-value pairs called labels. The captured data can be plotted in the form of dashboards using tools such as "Grafana" dashboard monitoring.

At 304, each of the captured events of 302 are used to populate a graph database ("GDB"). A GDB is a database that uses graph structures for semantic queries with nodes, edges, and properties to represent and store data. A key concept of the system is the graph (or edge or relationship). The graph relates the data items in the store to a collection of nodes and edges, the edges representing the relationships between the nodes. The relationships allow data in the store to be linked together directly and, in many cases, retrieved with one operation. Graph databases hold the relationships between data as a priority. Querying relationships is fast because they are perpetually stored in the database. Relationships can be intuitively visualized using graph databases, making them useful for heavily inter-connected data.

Graph databases are commonly referred to as a NoSQL database, meaning that the approach to storing, querying and describing these data structures differs significantly from a traditional relational database. While the graph model explicitly lays out the dependencies between nodes of data, the relational model and other NoSQL database models link the data by implicit connections. Relationships can be labelled, directed, and given properties. In one embodiment, the "graph database" from Oracle Corp. is used at 304.

At 304, using the graph database, the different kinds of information at 302 are persisted as nodes and their relationships. A node in general represents an item such as an application, compute, network, database or any cloud resource that generates alerts and is critical to the operation of the overall system, generically referred to as a "feature" of cloud infrastructure 104. Further, features such as a log line can be an additional node, a monitoring event can be an additional node, etc. Further, telemetry events can be viewed as separate nodes in the database. All these nodes, corresponding to one of the features, are connected via their relationship if a relationship exist between them. The relationship between nodes are generated based on the impact of the changes between them, and therefore are dynamic in nature. As a result of 302 and 304, a data set is built which includes the various nodes and their relationship in an organized way.

The functionality of 302 and 304, collectively referred to as data preprocessing and transformation, is continuously being executed so that the data set is constantly being updated by logs, monitoring, telemetry, and system event data. The generated graph database includes both the static topological information (i.e., a base topology) and constantly enriches itself with runtime information which is constantly coming from the above-mentioned sources. Static topology is the state at which the cloud components are defined and implemented such as networks, storage, DB, compute instance, based on pre-defined capacity planning and estimates.

Figure 4:
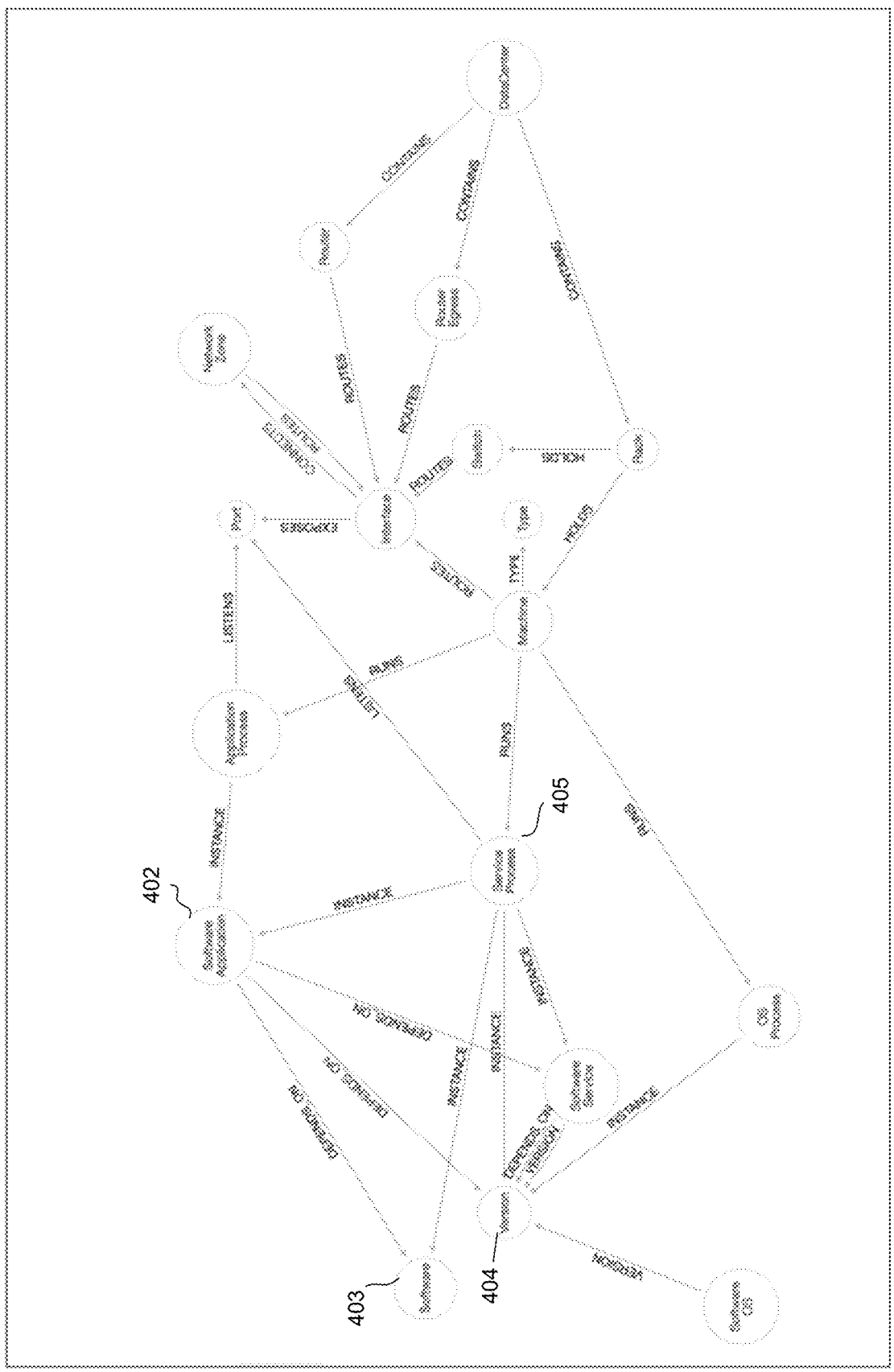
FIG. 4 is an example graph visualization for a software application executing on the cloud in accordance to embodiments of the invention.

FIG. 4 is an example graph visualization generated by 302 and 304 for a software application executing on the cloud in accordance to embodiments of the invention. The graph shown in FIG. 4 is a simplified illustration for application 402 and includes nodes and their relationship in a network system. Included in the graph are dependent components/entities/features such as the software 403 that application 402 is running, the version 404 of application 402, the service process 405, etc. The graph of FIG. 4 is just a small snippet of the whole graph, as the relationships becomes much more complex once additional dependent features such as logs, monitoring, telemetry, system events etc., are added. The visualization of the graph is useful for administrators, etc. of cloud 104 to visualize and pinpoint issues.

As an example of how the details of FIG. 4 impact alerts, assume an alert criteria is established where when 5 API requests in 10 seconds are received, an alert is generated. However, this "static" alert system does not take into account dynamic processes. For example, service process 405 may be currently installing a software patch, which may require the alert criteria to be temporarily changed during the patching process. Or, the particular port of the API may be currently having a problem. In this example, embodiments can temporarily change the threshold of the alert to account for activity in the overall system. Embodiments can also generate a new alert if needed.

Node Classification

Using the graph DB as input, embodiments in general use a trained neural network to perform node classification, which predicts characteristics of each node of the graph (e.g., the probability that the node fails, what alert/threshold needs to be set for the node, etc.) and then labels each node with a "prediction label". In one embodiment, a graph neural network ("GNN"), which is a class of neural networks for processing data represented by graph data structures, is implemented. The GNN can directly operate on the graph structure generated at 302 and 304 since a GNN is intended to operate on a graph structure.

In general, a GNN is trained with a dataset and the trained GNN associates every node in the graph with a label. 308, 310, 314 and 316 collectively train and implement the GNN model. The data prepared at 302 and 304 is used to build the GNN classifier model. It will be based on the node classification algorithm. Node classification is the process of labeling the node based on the relationship between that node and other nodes and how that relationship is depicted as an embedding as part of the node label. The node classification is done based the nature of component change, business impact and associated constraints which are mined from the causation analysis from the stored graph from 302 and 304. Causation analysis is the process by which the root cause is mined based on the evidence and manifestations available, such as events and precedents, to uncover the root of the problem where the change in a root component causes an impact in a different component. This data is constantly getting updated by various sources.

The GNN training and prediction process at 308, 310, 312 and 314 trains the GNN model 316 using the set of graph relationship as features used for training. The GNN model is initially trained using a dataset derived from 302 and 304. The labels are provided during the training phase based on the events/alerts under consideration. In general, embodiments implement a GNN algorithm for node classification is follows:

Apply preprocessing with the edges and nodes using a recurrent neural network ("RNN") to the node features (metrics) to generate initial node representations. An RNN is a class of artificial neural networks where connections between nodes form a directed graph along a temporal sequence. This allows it to exhibit temporal dynamic behavior.

Generate node embeddings with one or more graph convolutional layers on the node representation. Node embeddings are symbolic way of labeling the nodes where every node is represented in an unique manner.

Apply post-processing on the node embeddings such as the impact score of the node from the historical data to generate the final node embeddings. In embodiments, the "impact score" is a probability based score where the value can be 0 to 1 or any further calculation that would apply weights to the arrived probability. For example, the probability score can be converted to a scale such as 0-100% or any measure that is convenient to define the magnitude.

Feed the node embeddings into a softmax function layer to predict the node classification, which is referred to as a "fault event". The softmax function is often used in the final layer of a neural network-based classifier. Such networks are commonly trained under a log loss (or cross-entropy) regime, giving a non-linear variant of multinomial logistic regression.

Alert and Threshold Values Generation

Once a classified node is identified and predicted to generate a fault event, new alerts are generated for them at 312. If the alerts are already in place, the threshold values are modified accordingly at 312. The threshold limit defines the acceptable fault level, and it may vary across nodes classified. The newer alerts can be automated or done with a "human in loop" for reviews of the threshold setting. In embodiments, the process is implemented in a fully automated mode (i.e., without human intervention) as the output of the classification is based on the complexity of the underlying network, so a complex network cannot be properly evaluated by a human.

Examples of Generated Alerts and Threshold Modifications

Figure 5:
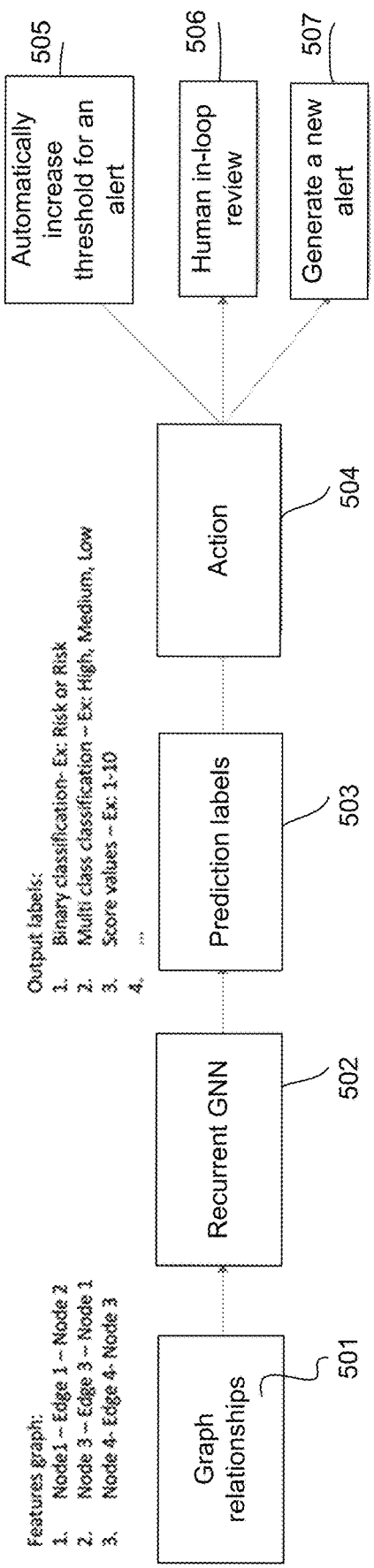
FIG. 5 illustrates functionality when performing the base version upgrade and generating alerts and/or revised thresholds in accordance to embodiments.

One example of implemented embodiments is in response to an upgrade to a base version of a software library. It is known that in past upgrades of the library, there were consequences on memory footprint and CPU usage. FIG. 5 illustrates functionality when performing the base version upgrade and generating alerts and/or revised thresholds in accordance to embodiments. At 501, the graph DB is generated with each node representing a feature of cloud infrastructure 104. Table 1 below provides an example of some of the features, the metrics of the features, and the relationships to other features, which is reflected in the graph DB. At 502, the graph DB is input to the trained recurrent GNN, which generates prediction labels, or node classification, at 503. Examples of the prediction labels includes a binary classification (e.g., risk or no risk), a multi class classification (e.g., high, medium, low) or numerical score values (e.g., 1-10) Based on the labels, at 504 various actions are implemented. The actions may include at 505 automatically increasing the threshold for an existing alert, at 507 generating a new alert, or a human may provide a review before an action is automatically implemented.

For example, the GNN may predict that a compute instance needs to be monitored for growth in memory over a time period. A new alert is generated based on a 30 second interval for memory consumption up to "x" limits. This x needs to be determined based on heuristics or historical value based on a baseline. The computation of "x" will be recommended by the system based on the impact score from the node classification. The threshold varies for various different events, hence the learning component gathers such values from the graph database itself to predict a set of recommended values for each node based on the impact value and type of event. In embodiments, the learning component is the training and retraining process by which the GNN is trained on new information and a dataset as feedback based on performance metrics such as precision, accuracy, recall, etc. Once the value is determined, the system can then set the derived threshold value for the alert in the alerting system.

TABLE 1

| Features | Metrics | Relationships |
| --- | --- | --- |
| Memory footprint-RAM | Megabytes | $3^{rd}$ party, security patch |
| CPU consumption | % | OS characteristics, security patch |
| Network consumption | bits/sec | $3^{rd}$ party, OS characteristics |
| OS configuration | Type/class | Security patch, CPU shapes |

Figure 6:
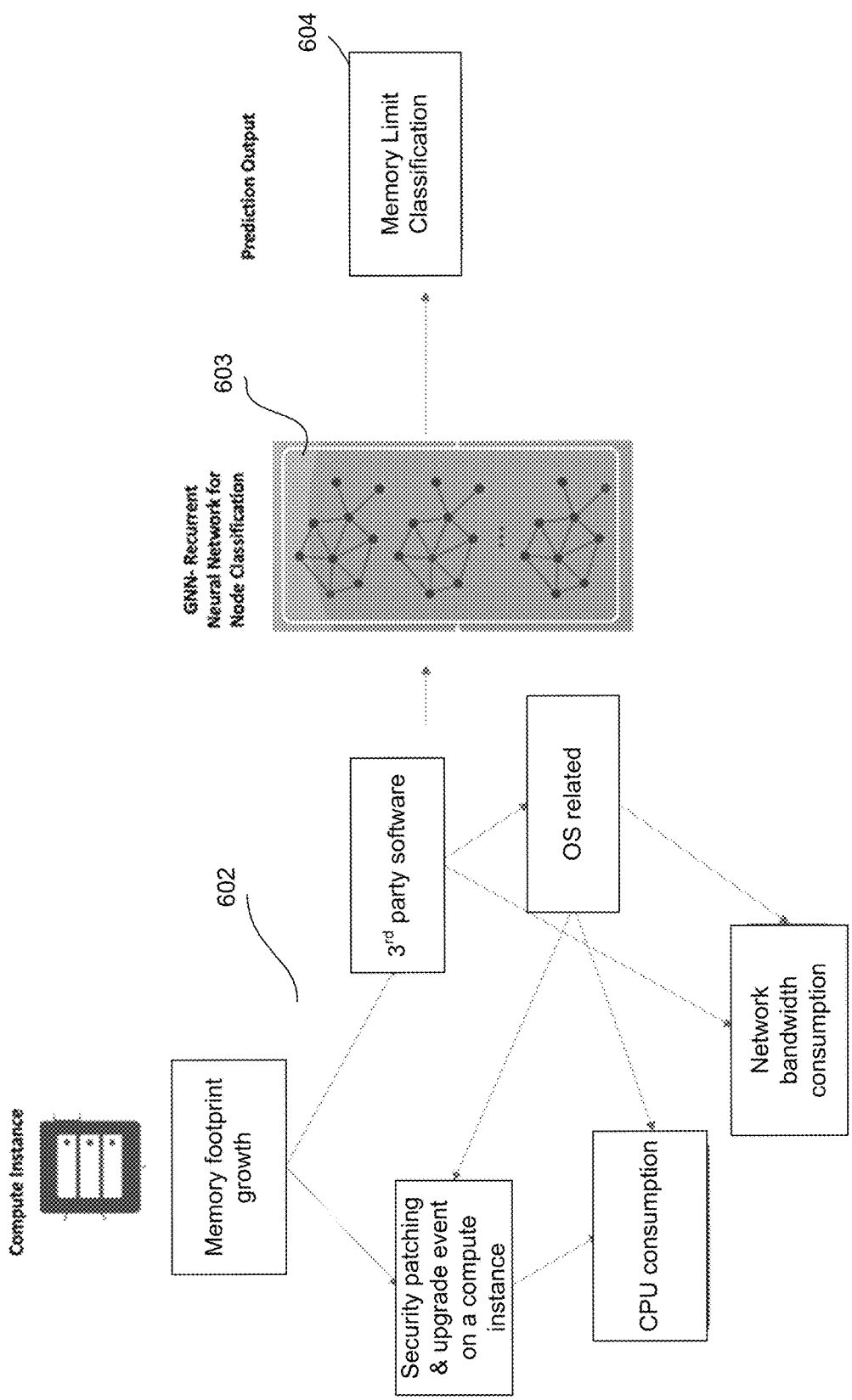
FIG. 6 further illustrates functionality when performing the base version upgrade and generating alerts and/or revised thresholds in accordance to embodiments.

FIG. 6 further illustrates functionality when performing the base version upgrade and generating alerts and/or revised thresholds in accordance to embodiments. The generated graph, stored in the graph DB, is shown at 602. At 603, the trained GNN classifies the nodes of 602. At 604, the prediction is output (i.e., memory limit classification). Memory limit classification can be a new alert or revised threshold if it is defined already. For example, the memory limit to monitor can be set as 2 GB but based on the prediction it can be changed to 1 GB since that is the new threshold where it needs to be monitored. If the memory limit is not defined before, this will provide a new alert with 1 GB as a starting value.

In another example of implemented embodiments, assume an application listens to a port, such as the Hypertext Transfer Protocol Secure ("HTTPS") port which uses port 443 by default. For an HTTPS connection, the application uses an Secure Sockets Layer ("SSL") certificate. The SSL certificate typically has an expiration date. There is also a certificate management system which updates the certificate with a new expiration date before the certificate is about to expire. This would prevent any certificate related issue the caller of the application may face if the certificate has expired.

However, there can be scenarios where a new certificate has been pushed by the certificate management system, but due to a wrong configuration (e.g., an invalid domain name) the certificate becomes invalid, and the caller begins to get failure messages.

Therefore, embodiments constantly feed information into the graph database, which captures the real time system information. If in the past an invalid certificate configuration has occurred, then, when a new certificate is pushed, embodiments receive the information from the graph database. The GNN system then performs causation analysis to predict an instance failure due to a bad certificate or expiration of the certificate. Further, embodiments can use the heuristic information (e.g., a manual input supplied by a human based on their prior knowledge, subject matter expertise and expert judgment as a review step) and if needed it can automatically create a new alert dynamically as part of a prediction to classify instance failure to monitor the certificate patching process.

Figure 7:
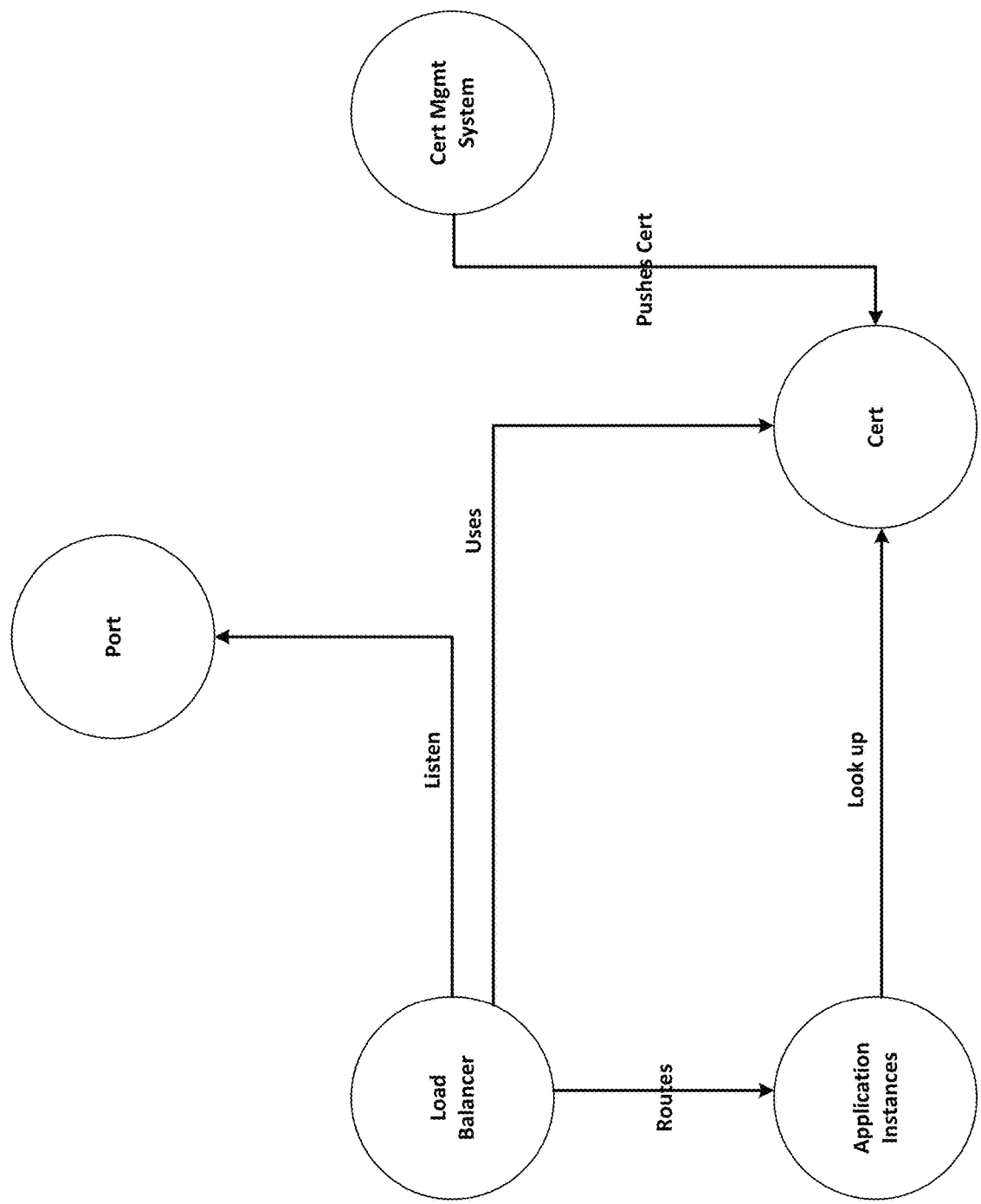
FIG. 7 illustrates a generated graph for the certificate management example in accordance to embodiments.

FIG. 7 illustrates a generated graph for the certificate management example in accordance to embodiments. Each of the nodes of the graph corresponds to a feature involved in the certificate management. Table 2 below provides an example of some of the features, the metrics of the features, and the relationships to other features, which is reflected in the graph DB.

TABLE 2

| Features | Metrics | Relationships |
| --- | --- | --- |
| Certification expiry | Time/Date | Cert management frequency, Load balancer, Instance |
| Load balancer traffic | Request per second | Instance, port listeners |
| Instance requests | Request processing time | Certificates, load balance requests |
| Listener ports | Number of ports & IPs configured | Load balancers |

Figure 8:
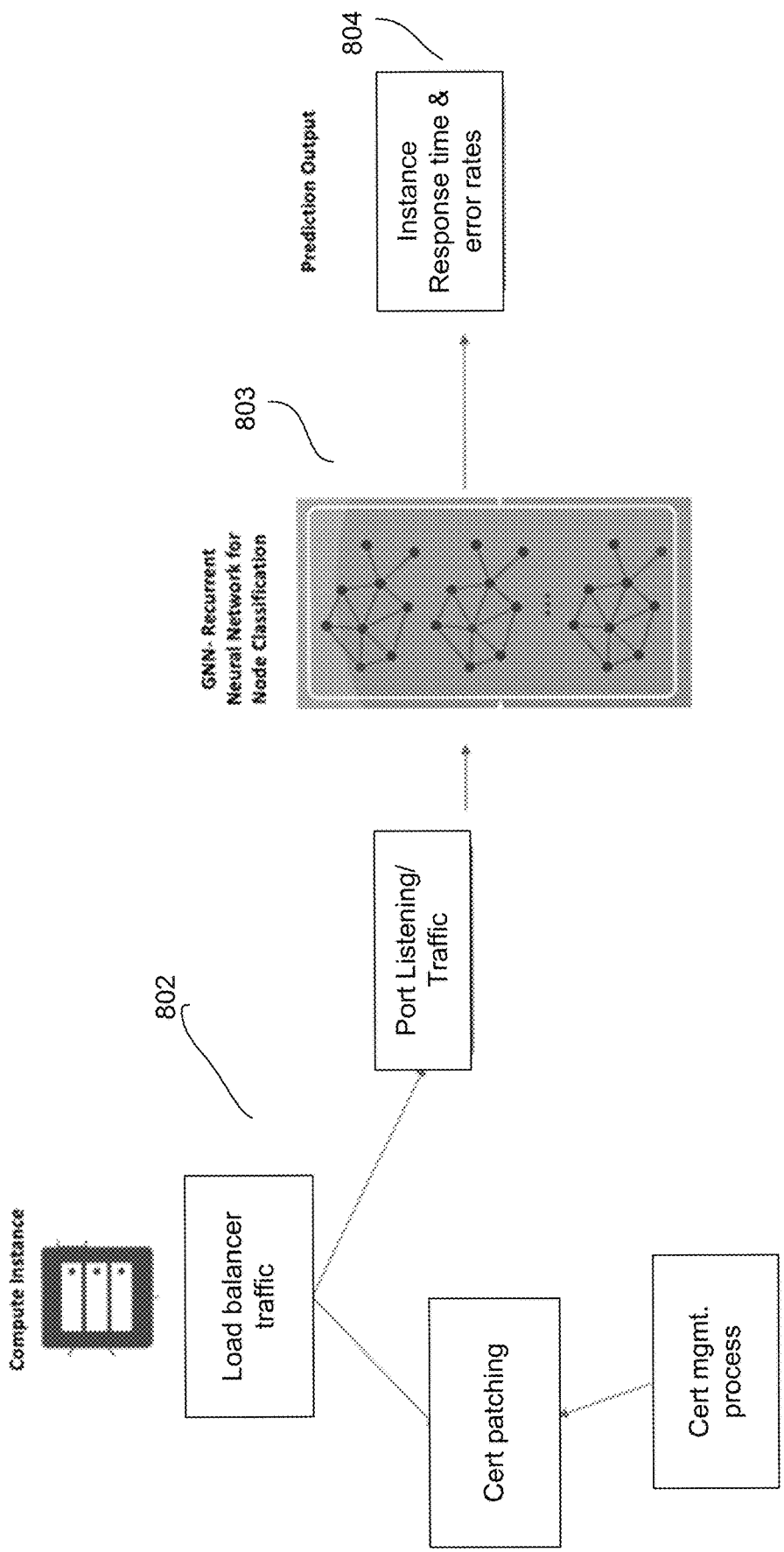
FIG. 8 further illustrates functionality when performing the monitoring of certificate expiration and generating alerts and/or revised thresholds in accordance to embodiments.

FIG. 8 further illustrates functionality when performing the monitoring of certificate expiration and generating alerts and/or revised thresholds in accordance to embodiments. The generated graph, stored in the graph DB, is shown at 802. At 803, the trained GNN classifies the nodes of 802. At 804, the prediction is output (i.e., the instance response time and error rates) which can be a new alert or a threshold change for an existing alert). For example, and instance response time and 4 xx error rate to monitor can be set as 200 ms and 500 error count for 4 xx but based on the prediction it can be changed to 100 ms and 500 error count since that is the new threshold where it needs to be monitored. If the limit is not defined before, this will provide a new alert with 100 ms and 500 error count as a starting value.

In another example, assume there is a web site login page which captures how long a login request takes and includes an alert that has a value of 20 milliseconds ("ms"). Therefore, if a request takes more than 20 ms, then something is wrong and an alert will be triggered. This alert configuration may be appropriate for general cases, but there may be a downstream system which has been affected. The information will be feed into the graph database. Embodiments then process this information and as a result a new threshold for the above login request is revised to 45 ms. The new threshold will be sent to the monitoring system via, for example, an API call and the alert will now be generated if the request takes more than 45 ms instead of 20 ms. After some time if the downstream system recovers, the same information will be fed into the graph database and then embodiments will generate a new threshold appropriate for that time and update the value again, all without human involvement.

Figure 9:
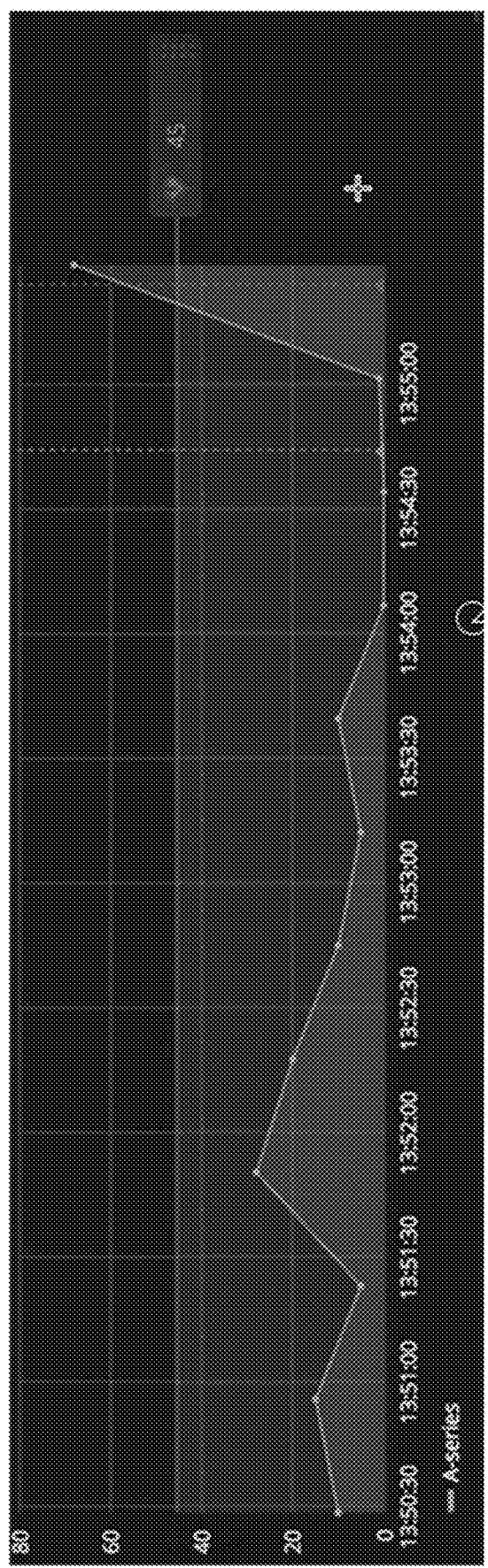
FIG. 9 is a graph illustrating the threshold on the X-axis varying over time for the login alert in accordance to embodiments.

FIG. 9 is a graph illustrating the threshold on the X-axis varying over time for the login alert in accordance to embodiments. As shown, the threshold for the alert varies from 0-65 ms. In other embodiments, the threshold will never reach 0 ms (e.g., at a minimum, greater than 10 ms.)

Example Cloud Infrastructure

FIGS. 10-13 illustrate an example cloud infrastructure that can incorporate the dynamic alert and threshold generation in accordance with embodiments. The cloud infrastructure of FIG. 10-13 can be used to implement network/cloud 104 of FIG. 1. As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
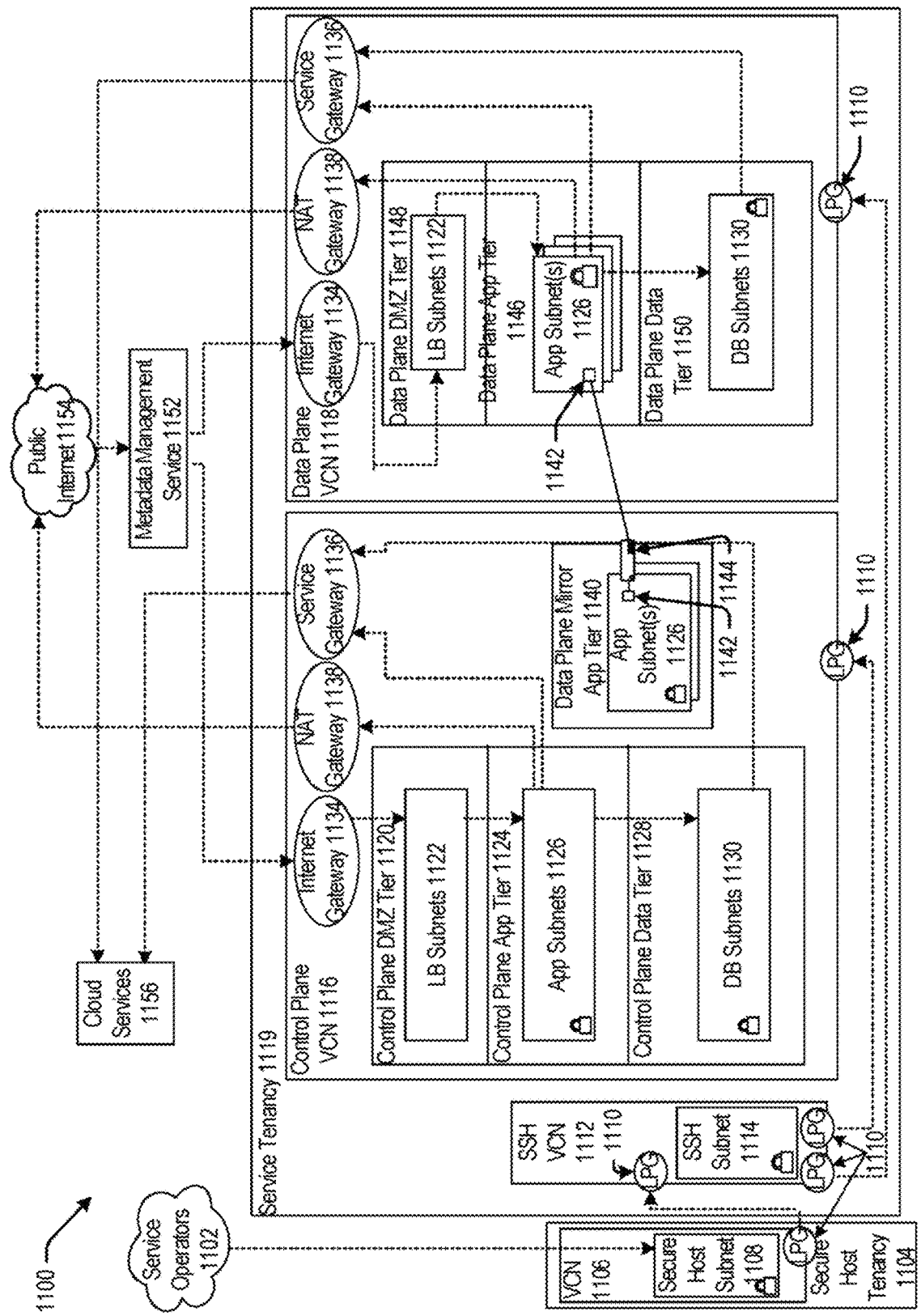
FIGS. 10-13 illustrate an example cloud infrastructure that can incorporate the dynamic alert and threshold generation in accordance to embodiments.

FIG. 10 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 11:
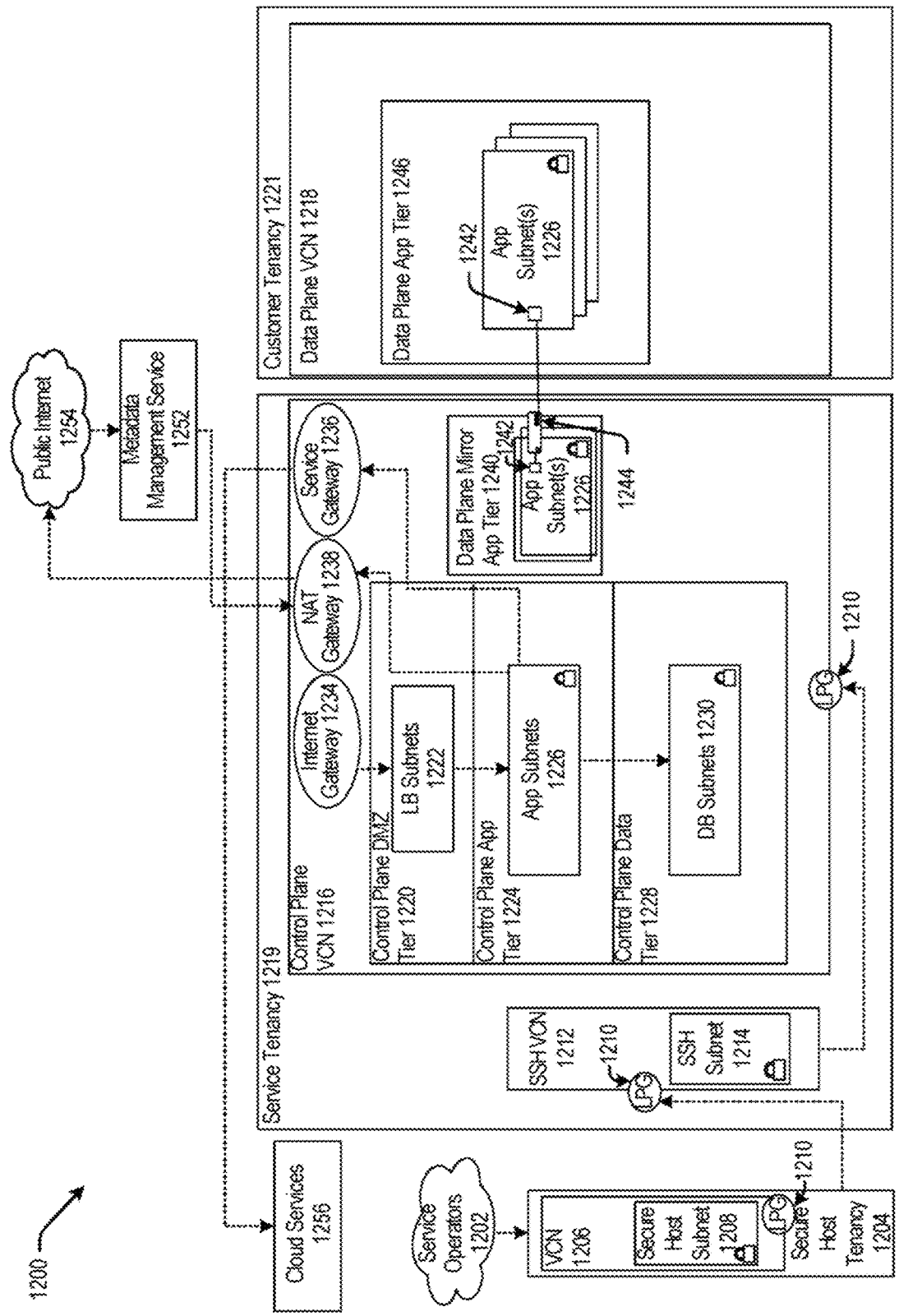

FIG. 11 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 12:
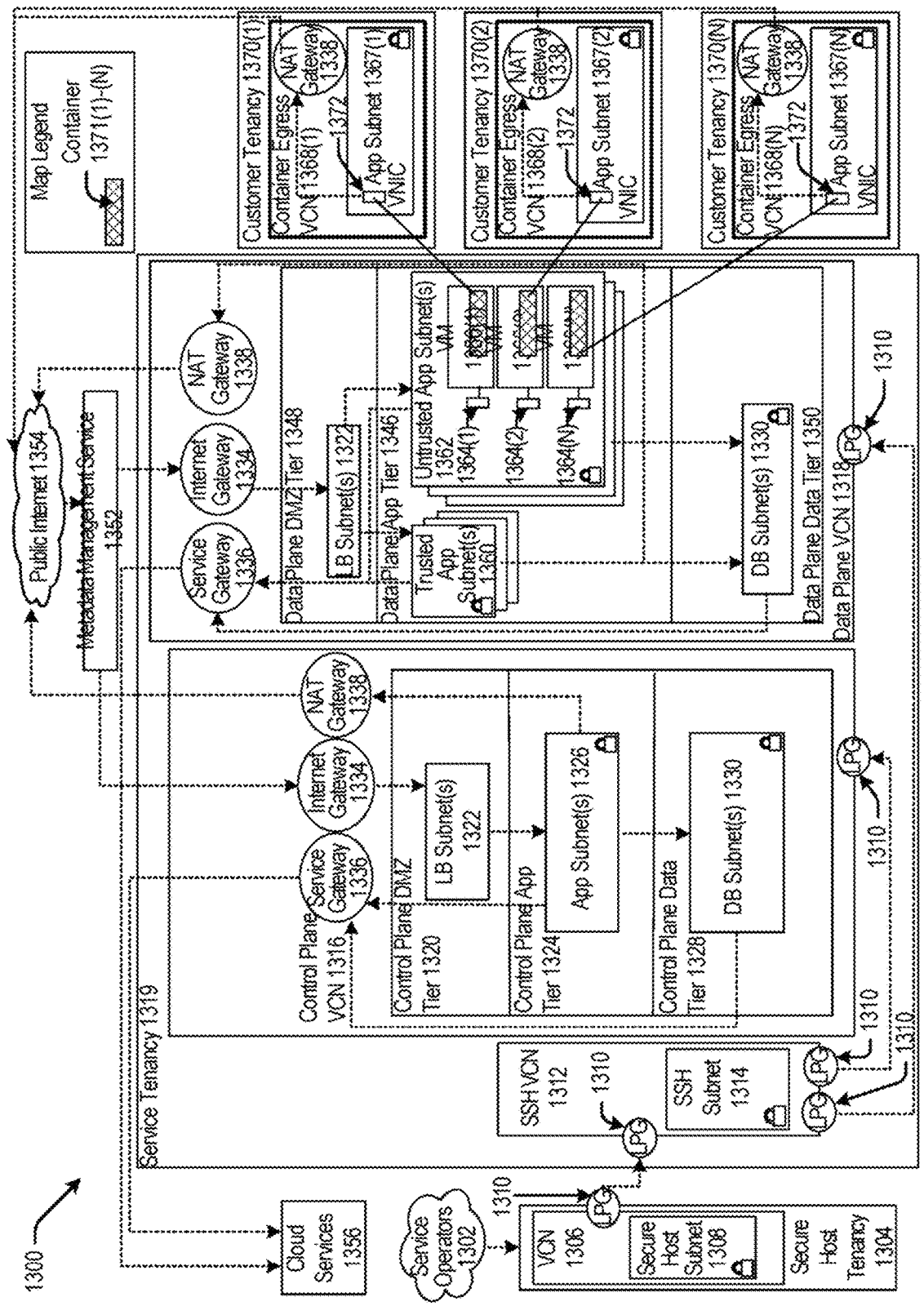

FIG. 12 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11).

The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 13:
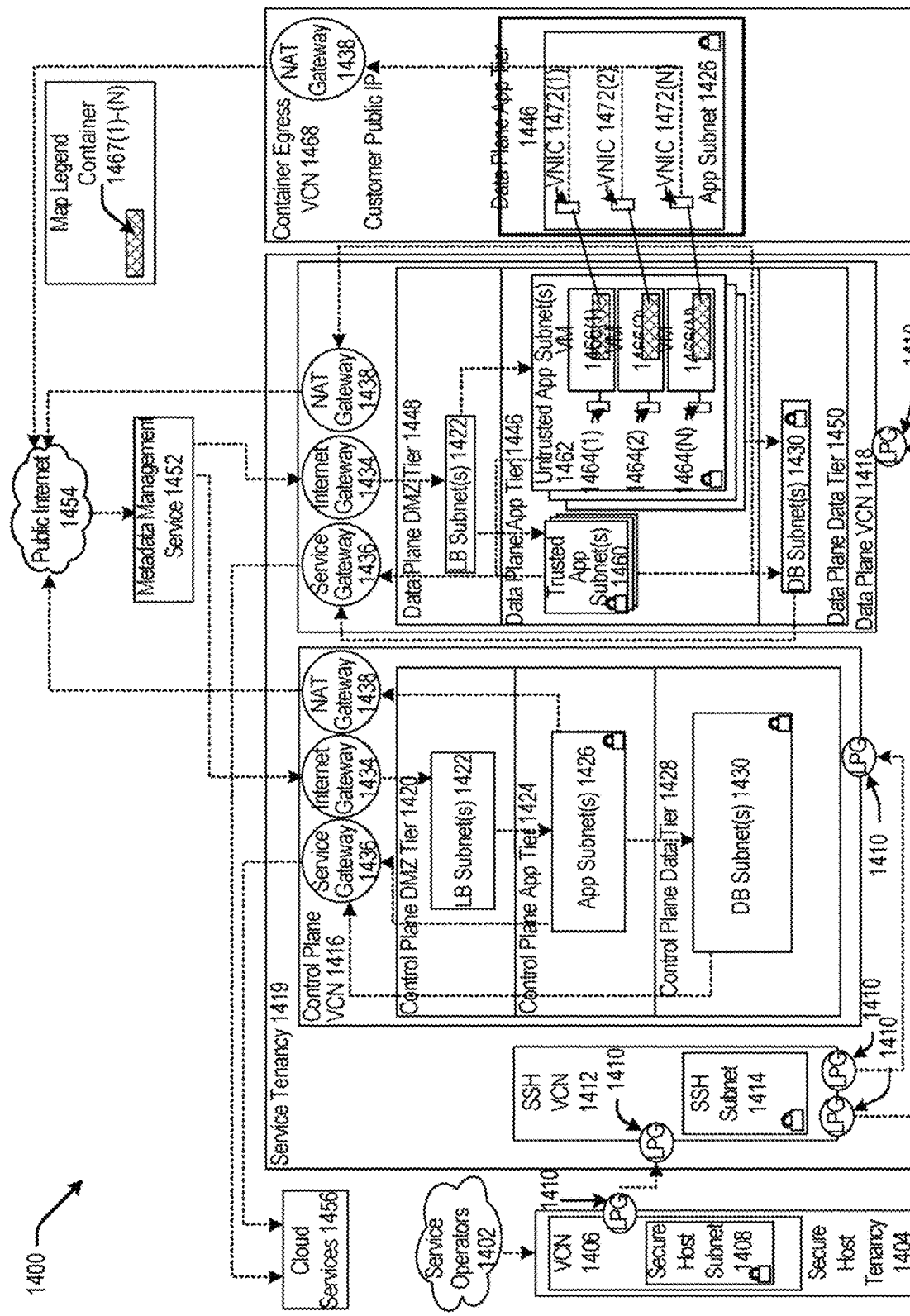

FIG. 13 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-

(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 13 may be considered an exception to the pattern illustrated by the architecture of block diagram 1300 of FIG. 12 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

As disclosed, embodiments dynamically generate alerts and/or modify alert thresholds with a cloud-based system. The dynamic generation includes generating a graph DB of nodes of the cloud-based system and then use a GNN to classify the nodes in order to predict node failures.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of monitoring for faults in a cloud based network for a plurality of features comprising an application and dependent features, the method comprising:
generating a graphical representation of the plurality of features comprising a plurality of nodes and corresponding relationships between the nodes, each node corresponding to one of the plurality of features;
monitoring for events for the plurality of features, the events corresponding to one or more of the nodes, to generate monitored events;
populating a graph database with the monitored events;
training a graph neural network (GNN) using a training dataset derived from the monitoring and the populating;
classifying each of the nodes with the trained GNN, the classification comprises a prediction of a failure of at least one node;
based on the classifying, for a first failure node corresponding to the prediction, automatically revising a threshold for an existing alert for the first failure node; and
retraining the trained GNN using the revised threshold for the existing alert.

2. The method of claim 1, the classifying comprising labeling each of the nodes based on the relationship between other nodes.

3. The method of claim 2, the labeling comprising one of a binary classification, a multi class classification, or a score value.

4. The method of claim 1, the trained graph neural network comprising:

applying preprocessing with edges and nodes using a recurrent neural network (RNN) to node features to generate initial node representations;
generating node embeddings with one or more graph convolutional layers on the node representations;
applying post-processing on the node embeddings; and
feeding the node embeddings into a softmax function.

5. The method of claim 1, wherein each of the plurality of features corresponds to a resource of the cloud based network that generates a corresponding alert.

6. The method of claim 1, the events comprising at least logs, telemetry data, and system event data.

7. A non-transitory computer readable medium having instructions stored thereon that, when executed by one or more processors, cause the processors to monitor for faults in a cloud based network for a plurality of features comprising an application and dependent features, the monitoring comprising:
generating a graphical representation of the plurality of features comprising a plurality of nodes and corresponding relationships between the nodes, each node corresponding to one of the plurality of features;
monitoring for events for the plurality of features, the events corresponding to one or more of the nodes, to generate monitored events;
populating a graph database with the monitored events;
training a graph neural network (GNN) using a training dataset derived from the monitoring and the populating;
classifying each of the nodes with the trained GNN, the classification comprises a prediction of a failure of at least one node;
based on the classifying, for a first failure node corresponding to the prediction, automatically revising a threshold for an existing alert for the first failure node; and
retraining the trained GNN using the revised threshold for the existing alert.

8. The computer readable medium of claim 7, the classifying comprising labeling each of the nodes based on the relationship between other nodes.

9. The computer readable medium of claim 8, the labeling comprising one of a binary classification, a multi class classification, or a score value.

10. The computer readable medium of claim 7, the trained graph neural network comprising:
applying preprocessing with edges and nodes using a recurrent neural network (RNN) to node features to generate initial node representations;
generating node embeddings with one or more graph convolutional layers on the node representations;
applying post-processing on the node embeddings; and
feeding the node embeddings into a softmax function.

11. The computer readable medium of claim 7, wherein each of the plurality of features corresponds to a resource of the cloud based network that generates a corresponding alert.

12. The computer readable medium of claim 7, the events comprising at least logs, telemetry data, and system event data.

13. A cloud infrastructure comprising:
a graph database; and
one or more processors configured to execute instructions for monitoring for faults in a cloud based network for a plurality of features comprising an application and dependent features, the one or more processors dynamically generating alerts and threshold revisions comprising:
generating a graphical representation of the plurality of features comprising a plurality of nodes and corresponding relationships between the nodes, each node corresponding to one of the plurality of features;
monitoring for events for the plurality of features, the events corresponding to one or more of the nodes, to generate monitored events;
populating the graph database with the monitored events;
training a graph neural network (GNN) using a training dataset derived from the monitoring and the populating;
classifying each of the nodes with the trained GNN, the classification comprises a prediction of a failure of at least one node;
based on the classifying, for a first failure node corresponding to the prediction, automatically revising a threshold for an existing alert for the first failure node; and
retraining the trained GNN using the revised threshold for the existing alert.

14. The cloud infrastructure of claim 13, the classifying comprising labeling each of the nodes based on the relationship between other nodes.

15. The cloud infrastructure of claim 14, the labeling comprising one of a binary classification, a multi class classification, or a score value.

16. The method of claim 1, further comprising:
based on the classifying, for a second failure node corresponding to the prediction, generating a new alert for the second failure node.

17. The computer readable medium of claim 7, the monitoring further comprising:
based on the classifying, for a second failure node corresponding to the prediction, generating a new alert for the second failure node.

18. The cloud infrastructure of claim 13, the one or more processors further comprising:
based on the classifying, for a second failure node corresponding to the prediction, generating a new alert for the second failure node.

19. The method of claim 16, further comprising:
dynamically generating the new alert for the second failure node, the new alert establishing an interval for monitoring memory consumption.

20. The method of claim 16, further comprising:
dynamically generating the new alert for the second failure node, the new alert establishing a memory limit to monitor.

* * * * *